United States Patent [19]

Traub

[11] 3,718,338

[45] Feb. 27, 1973

[54] SEALING ASSEMBLY

[75] Inventor: Henry A. Traub, Pacific Palisades, Calif.

[73] Assignee: W. S. Shamban & Co., Los Angeles, Calif.

[22] Filed: Feb. 3, 1971

[21] Appl. No.: 112,274

[52] U.S. Cl. ...................277/165, 277/176, 277/188
[51] Int. Cl. ............................F16j 9/00, F16j 15/32
[58] Field of Search.......277/165, 188, 176, 177, 178

[56] References Cited

UNITED STATES PATENTS

| 3,394,941 | 7/1968 | Traub | 277/165 X |
| 3,011,803 | 12/1961 | Buckner et al. | 277/165 |
| 2,905,489 | 9/1959 | Thompson et al. | 277/165 |
| 3,218,087 | 11/1965 | Hallesy | 277/188 X |

*Primary Examiner*—Samuel B. Rothberg
*Attorney*—Smyth, Roston & Pavitt

[57] ABSTRACT

An assembly comprising a slipper ring having an axial segment and a radial segment, a resilient deformable seal ring surrounding at least a region of the axial segment, and an anti-extrusion ring. At least a segment of the anti-extrusion ring surrounds at least a portion of the axial segment. The seal ring is axially intermediate the anti-extrusion ring and the radial segment. The radial segment has a face adapted to confront fluid under pressure with the area of the face being greater than the area of the deformable seal which generally faces the fluid under pressure.

11 Claims, 5 Drawing Figures

PATENTED FEB 27 1973  3,718,338

INVENTOR:
Henry A. Traub
By: Smyth, Roston & Pavitt
ATTORNEYS

SEALING ASSEMBLY

BACKGROUND OF THE INVENTION

Sealing assemblies are used between members such as relatively movable inner and outer members to form a substantially fluid tight seal therebetween. Sealing assemblies frequently include an elastomeric or resilient deformable ring which is isolated from rubbing contact with the relatively movable members by slipper ring. Fluid under pressure acts on the resilient deformable ring. The elastomeric material acts as a fluid when subjected to pressure with the result that the deformable ring forces the slipper ring into tight engagement with one of the relatively movable members.

SUMMARY OF THE INVENTION

The present invention is based in part upon the recognition that sealing effectiveness is improved when the unit loading on the deformable ring is increased. With this invention the unit loading on the deformable ring is increased by appropriately configuring the deformable ring and the slipper ring.

Specifically, the slipper ring includes an axial segment and a radial segment with the radial segment having a face which is adapted to confront the fluid under pressure. The deformable ring surrounds at least a region of the axial segment. The slipper ring is mounted so that it can be moved generally axially to squeeze the deformable ring generally axially between the slipper ring and an appropriate surface.

The face of the slipper ring which confronts the fluid under pressure is of larger area than the area of the seal which generally confronts the fluid under pressure. The result is that the unit loading on the deformable seal is increased over the unit loading that would exist if the fluid pressure were to act, in effect, on the deformable seal alone. Thus, the slipper ring, in effect, miltiplies the pressure of the fluid to a higher level for use in squeezing of the deformable ring. This results in significantly improved sealing effectiveness as the deformable ring acts as a fluid to apply the multiplied unit loading thereon against the axial segment of the slipper ring.

One problem with increasing the unit loading on the deformable ring is that it increases the tendency of the deformable ring to extrude. To prevent such extrusion, the present invention provides an anti-extrusion ring which is structurally interrelated with the slipper ring so as to prevent extrusion of the deformable ring. The anti-extrusion ring surrounds a portion of the axial segment and as such cooperates with the slipper ring to prevent extrusion of the deformable ring. The anti-extrusion ring also provides a bearing surface for the deformable ring and loads the tip of the slipper ring against one of the relatively movable members to assist in providing a tight seal.

The anti-extrusion ring can be configured to provide different results. For example, the anti-extrusion ring can have an inclined face confronting the deformable ring to thereby assure that at least a component of the force applied by the deformable ring to the anti-extrusion ring will act radially against the tip of the axial segment. A similar effect can be obtained by dividing the anti-extrusion ring into two separate cam rings which cause the outermost tip of the axial segment to be urged radially against the adjacent movable member.

The present invention also provides for completely isolating the resilient seal from the fluid under pressure. This can be accomplished by utilizing a slipper ring which is of generally U or channel-shaped cross section and by providing an anti-extrusion ring which is slidably received between the outer ends of the legs of the U.

DESCRIPTION OF THE PREFERRED EMBODIMENT

Figure 1:
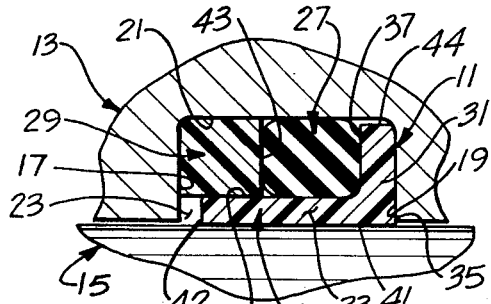
FIG. 1 is a typical, fragmentary, sectional view of one form of sealing assembly constructed in accordance with the teachings of this invention with the sealing assembly being subjected to little or no fluid pressure.

FIG. 1 shows a sealing assembly 11 constructed in accordance with the teachings of this invention. The sealing assembly 11 is adapted for use between an outer member 13 and a rod or rod member 15. The outer member 13 and the rod 15 may be movable axially or circumferentially relative to each other. The outer member 13 has radial walls 17 and 19 interconnected by a circumferential wall 21 to define a groove 23. The sealing assembly 11 is positioned in the groove 23 as shown.

The sealing assembly 11 generally includes a slipper ring 25, a resilient deformable seal ring 27 and an anti-extrusion ring 29. The slipper ring 25 and the anti-extrusion ring 29 are harder and stiffer than the deformable ring 27 and may be constructed of a plastic such as a fluoroplastic with polytetrafluoroethylene being preferred. The deformable ring 27 may be constructed of a relatively soft material such as an elastomeric material.

The slipper seal 25 is generally L or angle-shaped in cross section. The slipper ring 25 includes a radial segment 31 and an axial segment 33 integral with the radial segment. The radial segment 35 projects radially beyond the axial segment 33 and has an annular end or outer face 35 which confronts the radial wall 19 and the high pressure side of the sealing assembly 11. The radial segment 31 has an inner face 37 which is of lesser radial dimension than the outer face 35 and which blends smoothly with a cylindrical outer, circumferential surface 39 of the axial segment 33. The slipper seal 25 also has an inner circumferential surface 41 which defines a passageway therethrough for snguly receiving the rod 15. In the embodiment illustrated, the surfaces 39 and 41 are concentric and cylindrical. The axial segment 33 terminates in an end face 42 which is spaced axially from the radial wall 17.

The anti-extrusion ring 29 in the embodiment illustrated in FIG. 1 is generally rectangular in axial cross section. The ring 29 is continuous and unsplit. The anti-extrusion ring 29 is slidably received between the circumferential wall 21 and the circumferential surface 39. The anti-extrusion ring 29 is supported axially by the rigid radial wall 17 and has a face 43 confronting the deformable ring 27.

The faces 37 and 43, the wall 21 and the surface 39 define a space for receiving the deformable ring 27. In the embodiment illustrated, the deformable ring 27 is subjected to some radial squeezing forces even when no fluid under pressure is being supplied to the sealing assembly 11. Thus, the deformable ring 27 is generally circular in cross section when not subjected to external forces; however, it assumes the somewhat rounded rectangular configuration shown in FIG. 1 when actually installed in the groove 23 with the rings 25 and 29. This initial compression of the deformable ring 27 is sufficient to form a low pressure seal. The radial dimension and the area of the face 35 exceed the radial dimension and the area, respectively, of the space between the circumferential wall 21 and the outer circumferential surface 39. Thus, the end face 35 has a greater effective area than the effective area of the deformable ring 27 which confronts the high pressure side of the sealing assembly 11.

Figure 2:
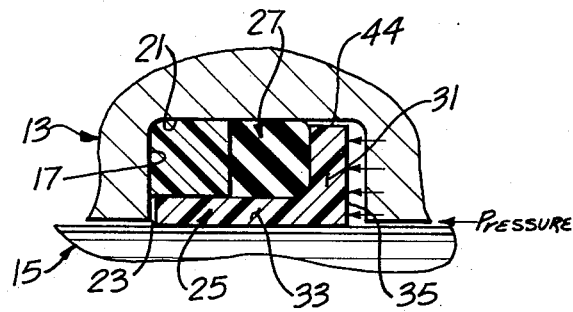
FIG. 2 is a fragmentary sectional view similar to FIG. 1 with fluid pressure being applied to the heel end of the seal assembly.

When fluid under pressure is applied to the sealing assembly 11 from the right as shown in FIG. 2, the slipper ring 25 moves to the left to reduce the axial spacing between the end face 42 and the radial wall 17. The fluid under pressure passes through an annular gap 44 and into contact with the deformable ring 27.

The fluid under pressure acts over the full relatively large area of the face 35. The force produced is resisted by the deformable ring 27 which acts over the relatively small area between the circumferential surface 39 and the circumferential wall 21. Consequently the unit loading on the resilient ring 21 exceeds the pressure of the fluid supplied to the face 35.

With the deformable ring 27 under a compressive load, the deformable ring acts substantially as a fluid to urge the axial segment 25 radially against the rod 15 and the anti-extrusion ring 29 axially tightly against the radial wall 17. The deformable ring 27 tightly engages the circumferential surface 39 and the circumferential wall 21 to prevent leakage. The anti-extrusion ring 29 cooperates with the portion of the axial segment 33 which it surrounds to positively prevent extrusion of the deformable ring 27. The face 43 of the anti-extrusion ring 29 forms an abutment for the deformable ring 27. The force applied to the anti-extrusion ring 29 by the deformable ring 27 tends to radially expand the anti-extrusion ring with the result that no gaps are provided on the low pressure side of the deformable ring 27 into which the deformable ring can extrude. The void defined by the faces 37 and 43, the circumferential surface 39 and the wall 21 is sized so that it will be completely filled by the material of the deformable ring 27 prior to the time that the end face 42 strikes the radial wall 17.

The shape of the groove 23 can be changed; however, a groove of generally rectangular cross section is standard and the sealing assemblies of this invention are adapted for use in a standard sealing groove. Although the groove 23 has been shown as in the outer member 13, it should be understood that it may be provided in the inner member or rod 15. In this latter event, the components of the sealing assembly 11 would be turned around so that the inner circumferential surface 41 would become the outer circumferential surface.

Figure 3:
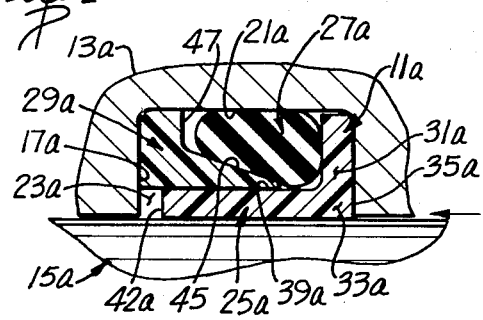
FIG. 3 is a typical fragmentary, sectional view similar to FIG. 1 of a second form of sealing assembly constructed in accordance with the teachings of this invention with the sealing assembly being subject to little or no fluid pressure.

FIG. 3 shows a sealing assembly 11a and members 13a and 15a which are identical to the sealing assembly 11 and the members 13 and 15, respectively, in every respect not specifically noted herein. Parts of FIG. 3 corresponding to parts of FIG. 1 are designated by corresponding reference numerals follows by the letter a.

The sealing assembly 11a generally includes a slipper ring 25a, a resilient deformable seal ring 27a and an anti-extrusion ring 29a. The embodiment of FIG. 3 differs from the embodiment of FIG. 1 in the construction of the anti-extrusion ring 29a. The anti-extrusion ring 29a has an inclined face 45 which extends radially outwardly of the rod 15a as it extends away from the radial segment 31a. The inclined face 45, in the embodiment shown in FIG. 3, is frustoconical. The inclined face 45 blends smoothly with an annular face 47. The anti-extrusion ring 29a is slidably received between the surface 39a and the circumferential wall 21a. The anti-extrusion ring 29a is supported against axial movement away from the radial segment 31 by the radial wall 17a.

The inclined face 45 serves several important functions in addition to preventing extrusion of the deformable ring 27b. First, it radially narrows and axially elongates the cavity in which the deformable ring 27a is received. Accordingly, when fluid under pressure is supplied to the face 35a from the right as viewed in FIG. 3, the deformable ring 27a is urged to the left until it engages the face 47. This results in a resultant force acting radially inwardly on the anti-extrusion ring 29a with such force acting closer to the end face 42a than would be possible without the axially elongated cavity for the resilient ring 27a.

Secondly, the incline of the face 45 is such that a component of the force exerted thereagainst by the radially compressed deformable ring 27a acts along a line which is generally perpendicular to the face 45 to thereby cause the force to act nearer the end face 42a than would be possible if the face 45 were cylindrical. Both of these factors contribute to forcing the so-called toe end, i.e., the end of the slipper ring 25a which contains the end face 42a, into tight sealing relationship with the rod 15a. This has the effect of improving sealing effectiveness.

Figure 4:
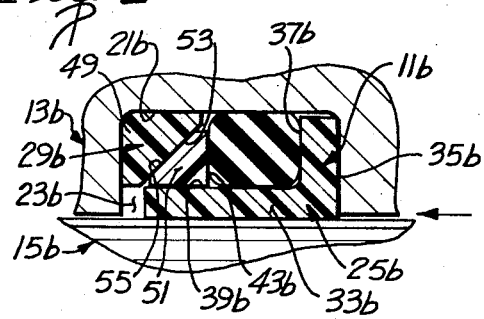
FIG. 4 is a typical, fragmentary, sectional view similar to FIG. 1 of a third embodiment of the present invention with the sealing assembly being subjected to little or no fluid pressure.

FIG. 4 shows a sealing assembly 11b which is identical to the sealing assembly 11 (FIG. 1) in every respect not specifically shown or described herein. The sealing assembly 11b is used with an outer member 13b and a rod 15b both of which are identical to the corresponding elements in FIG. 1. In FIG. 4 elements corresponding to elements shown in FIG. 1 are designated by corresponding reference numerals followed by the letter b.

The sealing assembly 11b includes a slipper ring 25b, a resilient deformable seal ring 27b and an anti-extrusion ring 29b. The sealing assembly 11b differs from the sealing assembly 11 in that the anti-extrusion ring 29b consists of cam rings 49 and 51. The can ring 49 has a conical cam surface 53 and is supported by the circumferential wall 21b and the radial wall 17b. The cam ring 51 has a conical cam surface 55 and an annular face 43b which engages the deformable ring 27b. The cam ring 51 slidably surrounds the circumferential surface 39 of the slipper ring 25b.

When fluid under pressure is supplied to the face 35b from the right as viewed in FIG. 4, the slipper ring 25b moves to the left to squeeze the deformable ring 27b between the faces 37b and 43b. This causes sliding movement of the cam surfaces 53 and 55 with the result that the cam ring 51 is urged radially inwardly tightly against the portion of the circumferential surface 39b which it engages. In this manner the toe end of the slipper ring 25 is urged tightly against the rod 15b. The cam ring 49 is urged radially outwardly against the circumferential wall 21b so that no gaps are provided into which the deformable ring 27b can extrude.

Figure 5:
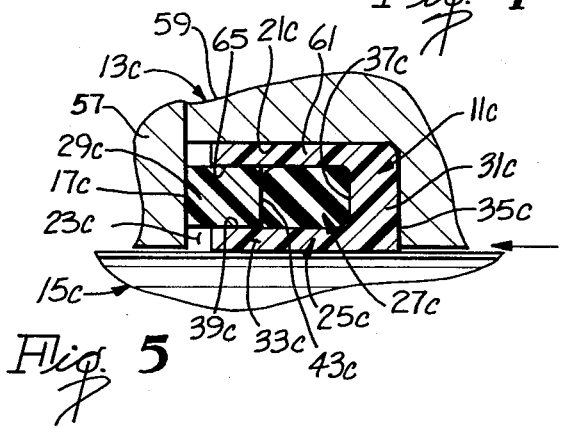
FIG. 5 is a typical, fragmentary, sectional view similar to FIG. 1 of a fourth embodiment of the present invention with the sealing assembly being subjected to little or no fluid pressure.

FIG. 5 shows a sealing assembly 11c which is identical to the sealing assembly 11 in every respect which is not shown or described herein, and corresponding parts are designated by corresponding reference numerals followed by the letter c. The sealing assembly 11c is carried in a groove 23c which is formed by the outer member 13c which in turn is defined by members 57 and 59. The rod 15c is identical to the rod 15 of FIG. 1.

The sealing assembly 11c includes a slipper ring 25c, a deformable ring 27c and an anti-extrusion ring 29c. The sealing assembly 11c differs from the sealing assembly 11 in that the slipper ring 25c is generally U or channel-shaped in cross section. Thus, the slipper ring 25c includes a radial segment 31c and a pair of axial legs or segments 33c and 61. The axial segments 33c and 61 are cylindrical and concentric with the radial segment 31c extending generally perpendicularly therebetween. The axial segments 33c and 61 have cylindrical circumferential surfaces 65 and 39c, respectively, and in the embodiment illustrated, are of equal axial length. The axial segments 33c and 61 and the radial segment 31c define an annular cavity in which the deformable ring 27c is received. In addition, a portion of the anti-extrusion ring 29c is slidably received between the surfaces 39c and 65 with the anti-extrusion ring being axially supported by the circumferential wall 17c. With this construction, the deformable ring 27c is isolated from the fluid under pressure.

Initially, the deformable ring 27c is radially compressed between the axial segments 33c and 61 with the result that these segments are urged tightly against the circumferential wall 21c and the rod 15c, respectively. This is sufficient to form a low pressure seal. When fluid under relatively higher pressures is applied to the face 35c from the right as viewed in FIG. 5, the slipper ring 25c is urged to the left relative to the anti-extrusion ring 29c. The deformable ring 27c is carried with the slipper ring 25c with the result that it is axially compressed between the faces 37c and 43c. The deformable ring 27c then further urges the axial segments 33c and 61 into tighter engagement with the rod 15c and the circumferential wall 21c, respectively.

Although exemplary embodiments of the invention have been shown and described, many changes, modifications, and substitutions may be made by one having ordinary skill in the art without necessarily departing from the spirit and scope of this invention.

I claim:

1. An assembly comprising:
   inner and outer relatively movable members, at least one of the members having first and second radial walls and a circumferential wall defining a groove;
   a slipper ring having an axial segment and a radial segment with the radial segment projecting radially of the axial segment, said radial segment having an end face, said slipper ring being positionable in the groove to surround the inner member with the end face generally facing the first radial wall and the fluid under pressure, said slipper ring being movable generally axially away from the first radial wall;
   a resilient deformable seal ring positionable in the groove and surrounding a region of the axial segment;
   an anti-extrusion ring positionable in the groove with the resilient deformable seal ring being generally axially intermediate the radial segment and the anti-extrusion ring, said slipper ring and said anti-extrusion ring being less readily deformable than said resilient deformable seal ring, said anti-extrusion ring being supportable by the second radial wall;
   said slipper ring being movable axially toward said ring member to axially squeeze said resilient deformable seal ring between said radial segment and said anti-extrusion ring; and
   the effective area of said end face being greater than the effective area of said seal ring generally confronting the fluid under pressure.

2. An assembly as defined in claim 1 wherein said slipper ring is generally L-shaped and constructed of a plastic material.

3. An assembly as defined in claim 1 wherein said slipper ring and said anti-extrusion ring cooperate to substantially completely enclose said resilient deformable seal ring.

4. An assembly adapted for exposure to fluid under pressure comprising:
   a slipper ring having an axial segment and a radial segment projecting radially of the axial segment, said radial segment having a face adapted to confront the fluid under pressure;
   a resilient deformable seal ring surrounding at least a region of the axial segment;
   an anti-extrusion ring, at least a segment of said anti-extrusion ring surrounding at least a portion of said axial segment, said seal ring being axially intermediate said segment of said anti-extrusion ring and said radial segment, said seal ring being more readily deformable than either said slipper ring or said anti-extrusion ring, the effective area of the seal ring generally confronting the fluid under pressure being less than the effective area of said face whereby the fluid under pressure tightly squeezes the seal ring between the radial segment and the anti-extrusion ring; and
   said anti-extrusion ring having an inclined face engaging the resilient deformable ring on the low pressure side of the resilient deformable ring.

5. An assembly as defined in claim 4 wherein said anti-extrusion ring includes cam means responsive to the squeezing of the seal ring for applying a radial force to said portion of said axial segment.

6. An assembly positionable in structure which has first and second radial walls and a circumferential wall defining a circumscribing groove, said assembly comprising:

a slipper ring having an axial segment and a radial segment with the radial segment projecting radially of the axial segment, said radial segment having an end face, said slipper ring being positionable in the groove so as to extend circumferentially of the groove with the end face generally facing the first radial wall and fluid under pressure, said slipper ring being movable generally axially away from the first radial wall;

a resilient deformable seal ring positionable in the groove and surrounding a region of the axial segment;

a ring member positionable in the groove with the resilient deformable seal ring being generally axially intermediate the radial segment and the ring member, said slipper ring and said ring member being less readily deformable than said resilient deformable seal ring, said ring member being axially supportable by the second radial wall;

said slipper ring being movable toward said ring member by the fluid under pressure with said resilient deformable seal ring resiliently resisting at least some of said movement of the slipper ring whereby the resilient deformable seal ring is axially squeezed between said radial segment and said ring member; and the effective area of said end face being greater than the effective area of said seal ring generally confronting the fluid under pressure whereby the axial squeezing force on the resilient deformable seal ring is increased.

7. An assembly as defined in claim 6 wherein the axial squeezing of the resilient deformable seal ring loads said ring member and said ring member includes cam means responsive to said load for applying a radial force to said axial segment.

8. An assembly as defined in claim 6 wherein said axial segment has a circumferential surface which is generally cylindrical.

9. An assembly as defined in claim 6 wherein said ring member does not substantially impede said movement of the slipper ring.

10. An assembly as defined in claim 6 wherein said ring member and said slipper ring have generally cylindrical surfaces which slide relative to each other during said movement of said slipper ring.

11. An assembly positionable in structure which has first and second radial walls and a circumferential wall defining a circumscribing groove, said assembly comprising:

a slipper ring having an axial segment and a radial segment with the radial segment projecting radially of the axial segment, said radial segment having an end face, said slipper ring being positionable in the groove so as to extend circumferentially of the groove with the end face generally facing the first radial wall and fluid under pressure, said slipper ring being movable generally axially away from the first radial wall;

a resilient deformable seal ring positionable in the groove and surrounding a region of the axial segment;

an anti-extrusion ring positionable in the groove with the resilient deformable seal ring being generally axially intermediate the radial segment and the anti-extrusion ring, said slipper ring and said anti-extrusion ring being less readily deformable than said resilient deformable seal ring, said anti-extrusion ring being axially supportable by the second radial wall;

said slipper ring being movable toward said ring member by the fluid under pressure with said resilient deformable seal ring resiliently resisting at least some of said movement of the slipper ring whereby a force is transmitted through the deformable seal ring to said anti-extrusion ring; and said anti-extrusion ring including cam means responsive to said force for applying a radial force to said axial segment.

* * * * *